United States Patent [19]

Noma et al.

[11] Patent Number: 5,145,536

[45] Date of Patent: * Sep. 8, 1992

[54] RADIAL TIRE WHICH RUNS SAFE AFTER A LOSS OF TIRE PRESSURE

[75] Inventors: Hiroyuki Noma; Saneto Saitou, both of Hyogo, Japan

[73] Assignee: Sumitomo Rubber Industries, Ltd., Hyogo, Japan

[*] Notice: The portion of the term of this patent subsequent to May 21, 2008 has been disclaimed.

[21] Appl. No.: 662,024

[22] Filed: Feb. 28, 1991

Related U.S. Application Data

[60] Division of Ser. No. 430,935, Nov. 2, 1989, Pat. No. 5,044,413, which is a continuation of Ser. No. 144,924, Feb. 10, 1988, abandoned.

[30] Foreign Application Priority Data

May 16, 1986 [JP] Japan ................. 61-113200

[51] Int. Cl.[5] .................. B60C 3/04; B60C 15/06; B60C 17/08
[52] U.S. Cl. .................. 152/209 WT; 152/454; 152/516; 152/522; 152/536; 152/544; 152/379.3; 152/379.5; 152/DIG. 3
[58] Field of Search ........ 152/209 WT, 454, 516–517, 152/DIG. 3, 522, 536, 544, 379.3, 379.5, DIG. 17

[56] References Cited

U.S. PATENT DOCUMENTS

| | | | |
|---|---|---|---|
| 2,104,532 | 1/1938 | Sommer | 152/209 R |
| 3,097,681 | 7/1963 | Harkins | 152/454 |
| 3,811,488 | 5/1974 | Duncan | 152/209 R |
| 3,814,161 | 6/1974 | Powell et al. | 152/454 |
| 4,007,769 | 2/1977 | Powell et al. | 152/454 X |
| 4,078,596 | 3/1978 | Nakayama et al. | 152/209 R |
| 4,142,567 | 3/1979 | Johannsen et al. | 152/517 X |
| 4,148,348 | 4/1979 | French et al. | 152/544 X |
| 4,231,409 | 11/1980 | Mezzanotte | 152/531 X |
| 4,250,939 | 2/1981 | Shibata et al. | 152/546 X |
| 4,349,061 | 9/1982 | Hirakawa et al. | 152/546 X |
| 4,454,903 | 6/1984 | Noel et al. | 152/536 X |
| 4,498,514 | 2/1985 | Maathuis et al. | 152/531 X |
| 4,723,584 | 2/1988 | Yamaguchi et al. | 152/DIG. 3 X |
| 4,745,956 | 5/1988 | Yagi et al. | 152/531 X |
| 4,766,940 | 8/1988 | Yokoyama et al. | 152/546 X |
| 5,016,697 | 5/1991 | Noma et al. | 152/454 |

FOREIGN PATENT DOCUMENTS 2087805 6/1982 United Kingdom .

OTHER PUBLICATIONS

*Mechanics of Pneumatic Tires*, ed. Samual Clark: U.S. Dept. of Transportation, Aug. 1981, p. 219.

Primary Examiner—Michael W. Ball
Assistant Examiner—Adrienne C. Johnstone

[57] ABSTRACT

The present invention relates to a radial tire and a radial tire-rim assembly. The radial tire (1) has a pair of beads (2), each bead having a bead core (3) and a bead apex (5), a carcass (4), with both edges thereof folded back around said bead core and fastened to said bead core, a tread (6), a belt layer (7), and an aspect ratio smaller than 60%. The tread is wider (in the axial direction) than the maximum width of said carcass and the edges of said tread are positioned within a range of 50-100% of the height of the cross-section of the carcass. This structure provides the tire side with rigidity and permits the tread to deform so that is supports the weight of the car and runs safely even when the tire pressure is decreased. The radial tire-rim assembly is characterized in that the bead of the radial tire has a toe (9) extending inward (in the radial direction of the tire) and is further provided with a hump groove (10) corresponding paramently,, the rim (20) has an annular groove (22) and hump (23) which fit into the toe and groove, respectively. These arrangements prevent the bead from separating from the rim when the tire pressure is decreased or at a time of sharp cornering.

7 Claims, 3 Drawing Sheets

RADIAL TIRE WHICH RUNS SAFE AFTER A LOSS OF TIRE PRESSURE

This application is a divisional of copending application Ser. No. 07/430,935, filed on Nov. 2, 1989, now U.S. Pat. No. 5,044,413, which is a continuation of prior application Ser. No. 07/144,924 filed on Feb. 10, 1988 (now abandoned), the entire contents of which are hereby incorporated by reference.

1. Technical Field

The present invention relates to a radial tire, and more particularly, it relates to a so-called safety tire for four-wheeled cars which permits the driver to continue safe driving even when the tire pressure has suddenly decreased due to puncture with a nail or otherwise bursts because it supports the weight of the car with the rigid side and the deformable tread. The present invention also relates to a radial tire-rim assembly which keeps the beads in place on the rim even in the case of puncture or at the time of sharp cornering.

2. Background Art

There have been proposed several kinds of tires designed to be safe even in the case of a puncture or other loss of air pressure. They include, for example, a safety tire having a support of elastic material in the tire, a dual structured tire having an independent toroidal air-tight compartment in the tire, and a reinforced tire with the side wall or shoulder reinforced with an elastic reinforcing layer attached to the inside thereof.

The first two types have a problem with increased weight (undesirable for a tire) and increased production cost. The last type is not strong enough to firmly support the load.

Accordingly, it is an object of the present invention to provide a new radial tire which, despite its structure is entirely different from that of the above-mentioned conventional tires, provides as good a ride comfort and stable maneuverability as ordinary tires during normal driving conditions and yet continues to run safely even when the tire pressure abruptly decreases due to puncture during high speed driving on a highway.

For safe driving, the tire should be firmly held in position on the rim. Heretofore, has been achieved mainly by the frictional force which is generated between the bead and the bead seat as the bead is pressed against the bead seat by the tire pressure. Therefore, the power to hold the tire on the rim decreases as the tire pressure decreases. In an extreme case where the tire pressure has decreased rapidly due to puncture and the steering wheel is quickly turned, the tire bead separates from the bead seat and falls into the well on account of the lateral force applied to the tire. As a result, the tire is completely displaced which leads to a serious accident.

The separation of the tire bead takes place in the following sequence. The cornering of the car produces a lateral force which moves the tread in the axial direction of the rim. The movement of the tread produces a moment of rotation around the bead and when the tire pressure is low, the moment of rotation lifts the heal of the bead, decreases the frictional force between the bead and the bead seat to such an extent that the bead slips out of place in the inward direction of the tire axis. In this state, the bead core loses tension for keeping the tire on the rim and thus falls into the well.

It is another object of the present invention to provide a radial tire-rim assembly which can run safely even when the tire pressure has decreased. The feature of the radial tire-rim assembly is due to the unique structure of the tire and rim. That is, the bead has a toe extending inward in the radial direction of the tire and the rim has an annular groove to mate with said toe. The toe-groove combination prevents the bead from falling into the well when the bead receives a lateral force.

DISCLOSURE OF THE INVENTION

The present invention provides a radial tire having a pair of beads, each bead having a bead core, a carcass extending across said beads, with both edges thereof folded back around said bead core and fastened to said bead core, one each of bead apex arranged between the folded part and the carcass proper, a tread arranged outside (in the radial direction of the tire) of said carcass, a belt layer arranged between said carcass and said tread, said belt layer having cords arranged slightly aslant with respect to the circumferential direction of the tire, and an aspect ratio (the height of the tire cross-section divided by the maximum width of the tire) smaller than 60%, said radial tire being characterized in that said tread is wider (in the axial direction) than the maximum width of said carcass and the edges of said tread are positioned within a range of 50–100% of the height of the cross-section of the carcass ply.

The present invention also provides a radial tire-rim assembly made up of said radial tire and a rim having a well to facilitate the mounting of the tire, said radial tire being characterized in that at least either of the beads is provided in a portion axially inward of the bead core with a toe which extends radially inwardly therefrom, and provided on the axially outside of the toe with a hump groove, and said rim being characterized in that it has an annular groove to receive the tip of the toe and a hump to fit into said hump groove.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

BEST MODE FOR CARRYING OUT THE INVENTION

Figure 1:
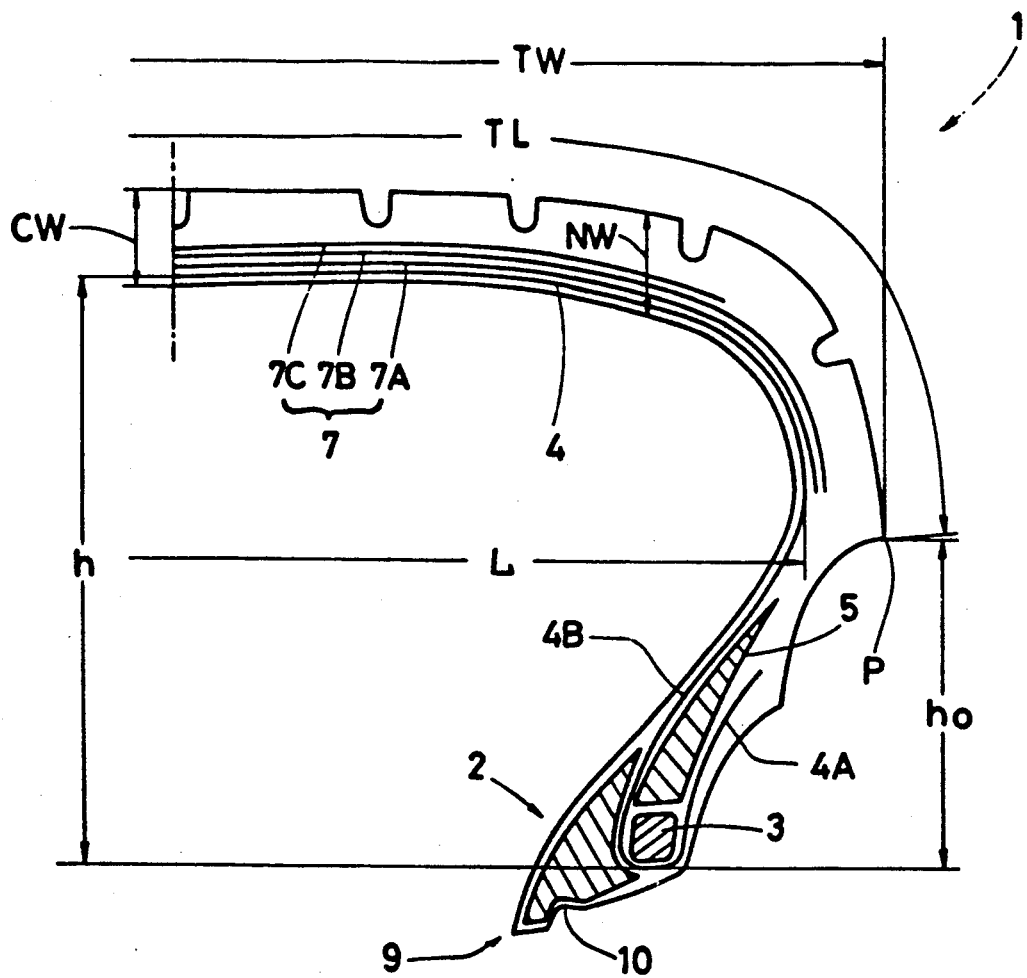
FIG. 1 is a sectional view showing the right half of an example of the radial tire of the invention.

The invention will be described with reference to an example shown in the drawings.

In the drawings, there are shown the radial tire 1, paired beads 2 each having the bead core 3, the carcass 4 extending from one bead 2 to the other, the tread arranged outside (in the radial direction of the tire) the carcass 4, and belt layer 7 arranged between the carcass 4 and the tread 6.

The radial tire of the present invention has an aspect ratio smaller than 60%, which is defined by dividing the height of the cross-section of the tire by the maximum width of the tire.

The carcass 4 has at least one layer of carcass ply composed of radially arranged cords. Each edge of the carcass is folded back (from inside to outside in the axial direction of the tire) around the bead core 3 and fastened to the bead core 3.

The first feature of the radial tire of the present invention resides in that the tread 6 extends to that part of the tire which corresponds to the side wall of the conventional tire. In other words, the tread 6 has such dimensions that the width TW (in the axial direction) is greater than the maximum width L of the carcass 4, and the height ho of the tread end P is within the range of 50 to 100% of the height h of the cross-section of the carcass 4.

In addition, the thickness of the tread 6 at both edges is within the range of 70 to 200% of the average value of the thickness CW at the tread center and the thickness NW at the position three quarters of the maximum width L of the carcass 4 measured from the tread center. If it is smaller than 70%, the tire does not have sufficient rigidity to ensure safe running when the tire pressure has decreased; and if it is higher than 200%, the tire generates excessive heat during high-speed running.

Figure 3:
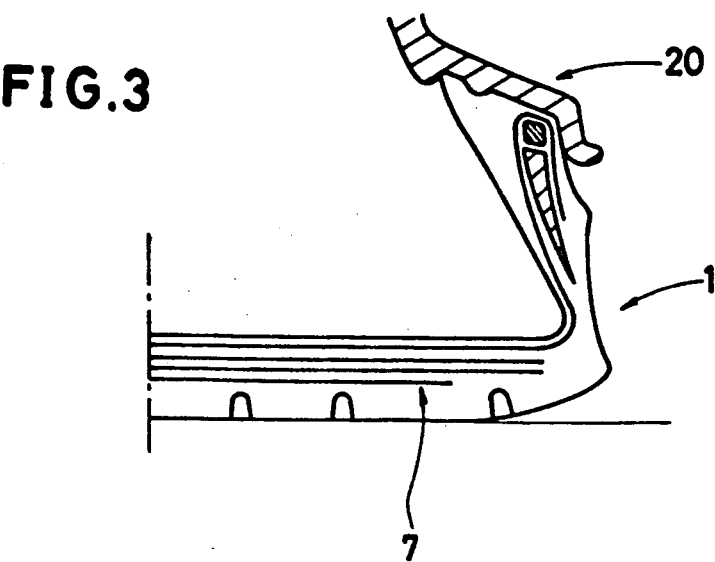
FIG. 3 is a schematic sectional view of the radial tire-rim assembly of the invention, with the tire pressure decreased.

The structure as mentioned above provides the difference in rigidity which functions as a hinge to join the tread and the tire side. Thus, when the tire pressure decreases, the tread and the tire side turn on the hinge as shown in FIG. 3, and the tread 6 as a whole becomes flat to ensure safe running.

Figure 2:
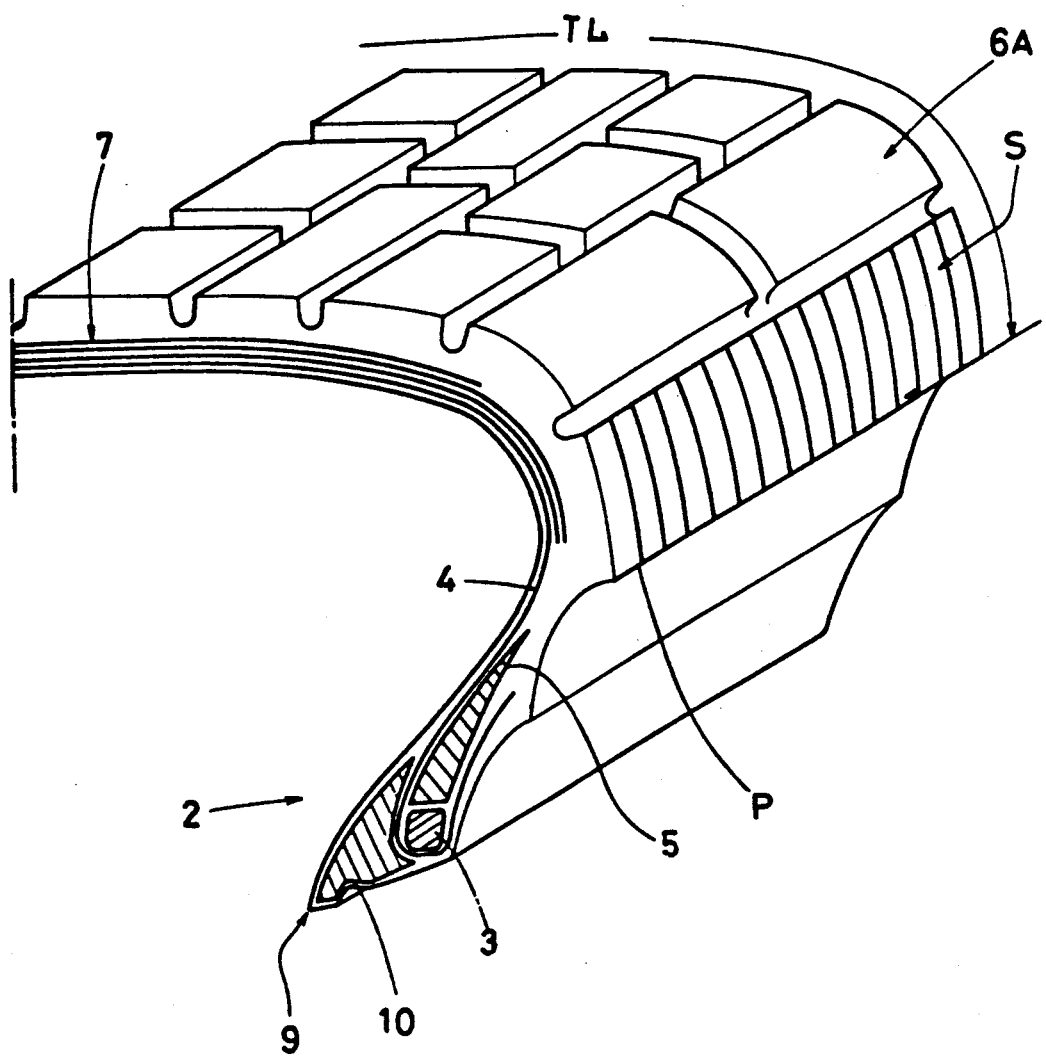
FIG. 2 is a perspective view of the radial tire of the invention.

The extended part 6A of the tread 6 is formed in a rug pattern or a block pattern and is provided with sipings or fine grooves S to increase heat dissipation as shown in FIG. 2. The sipings or fine grooves S are formed in the region corresponding to 5 to 20% of the curved distance TL from one tread end P to the other tread end along the surface of the tread 6. Their interval is 5 to 20 mm and their width is 0.1 to 5 mm. If they are formed at an angle of 45 to 90 degrees with respect to the circumferential direction of the tire, they promote heat dissipation, and if their angle is 0 to 45 degrees, not only do they promote heat dissipation but they also lower the vertical spring constant which leads to improved ride comfort. Thus the angle is selected according to the application.

The belt layer 7 is arranged between the carcass 4 and the tread 6, and it has cords arranged slightly aslant with respect to the circumferential direction of the tire. In this example, the cords are composed of low-modulus organic fiber cords (forming the plies 7A and 7B) and high-modulus organic or inorganic fiber cords (forming the ply 7C).

The width of the belt layer 7 (or the width of the plies 7A and 7B in this example) is within the range of 70 to 100% of the curved distance TL along the surface of the tread 6. The belt layer 7 extended to both edges of the tread 6 reinforces the tread 6 even when the tire pressure has decreased and the tread 6 has become flat, so that the flat tire continues to run for a long time.

The low-modulus organic fiber cords include those of nylon, polyester, and rayon which have an elastic modulus lower than 1000 kg/mm$^2$. The organic fiber cords of low elastic modulus are preferably used because the same ply produces the "hoop effect" on the crown, shoulder, and side which differ from one another in the radius of curvature.

The high-modulus fiber cords include aramid cords and steel cords. The ply 7C composed of the high-modulus fiber cord should have a width which is smaller than 80% of the maximum width L of the carcass 4.

The bead 2 is composed of the non-extensible bead core 3, the bead apex 5, the toe 9 which extends inward (in the radial direction of the tire), and the hump groove 10.

The bead core 3 is positioned outside (in the axial direction of the tire) unlike that of the conventional radial tire. This is one of the features of the present invention. The bead core 3 is positioned such that the distance w4 from the center of the bead core 3 to the heel end J is 1/2.5 to 1/7.6, preferably 1/2.9 to 1/6.3 of the distance between the heel end J and the toe end N. In the case of conventional tires, it is about 1/2.2 at the shortest. Incidentally, the heel end J is the point at which the prolonged line of the outer surface Q of the bead 2 intersects the prolonged line of the bottom surface M. The advantage to reducing the distance W4 is that the bead core 3 is close to the rim flange 25 and the bead firmly fits into the rim 20.

The bead apex 5 is made of rubber having a hardness of 74° to 95°, JIS(A). It is arranged between the carcass proper 4B and the folded part 4A of the carcass, and it extends outward (in the radial direction of the tire) from the bead core 3. The bead apex 5 is as high as 70–90%, preferably 40–110%, of the height ho up to the end P of the tread 6. A bead apex longer than 110% is not preferable because it hinders the above-mentioned hinge action. The bead apex of the specified length maintains the rigidity of the tire side when the tire pressure has decreased, thereby permitting safe driving.

The toe 9 projects inward (in the radial direction of the tire) from the bottom surface M of the bead 2 at the portion inward (in the axial direction of the tire) of the bead core 3.

The amount L of projection is properly selected according to the use and size of the tire. The toe 9 is made of comparatively hard rubber having a hardness of 70°–85°, JIS(A).

The hump groove 10 is formed outside (in the axial direction of the tire) the toe 9, and it extends in the circumferential direction of the tire. The distance W5 (in the axial direction of the tire) between the hump groove 10 and the heel end J is 2.1 to 4.8 times the distance W4 (in the axial direction of the tire) between the heel end J and the center of the bead core 3. The hump groove 10 permits the radial tire 1 of the present invention to snugly fit into the rim 20 having the hump 23 (mentioned later). The radial tire of the invention can also fit into a rim without the hump 23.

The rim 20 has the well 21 at the center and the annular groove 22, hump 23, bead seat 24, and rim flange 25 formed in the order mentioned outside the well. The annular groove 22 is adjacent to the well 21, and it extends in the circumferential direction of the tire. Therefore, the protuberence 26 extending in the circumferential direction is formed inside the annular groove 22. The height h1 of the protuberence 26 should preferably be 5 mm or less from the bead seat 24. The top of the protuberence 26 may be below the bead seat 24.

The bottom of the annular groove 22 should be inward (in the radial direction of the tire) from the bead seat 24, and the depth d should preferably be 10 mm or less from the bead seat 24. In addition, the annular groove 22 should be positioned such that the relationship W6/W3=0.7 to 1.2 is established, where W6 is the distance between the heel end J and the toe end N and W3 is the distance between the deepest part of the annular groove 22 and the end H of the bead seat 24. The end H of the bead seat 24 is the point at which the prolonged line of the bead seat 24 intersects the prolonged line of the inner surface of the rim flange 25.

The hump 23 is formed such that the relationship W5/W2=0.5 to 1.2 is established, where W5 is the distance (in the axial direction of the tire) between the hump groove 10 and the heal end J and W2 is the distance (in the axial direction of the tire) between the outermost end (in the radial direction of the tire) of the tire and the end H of the bead seat. The height h2 of the hump 23 should preferably be smaller than 5 mm from the bead seat 24.

Figure 4:
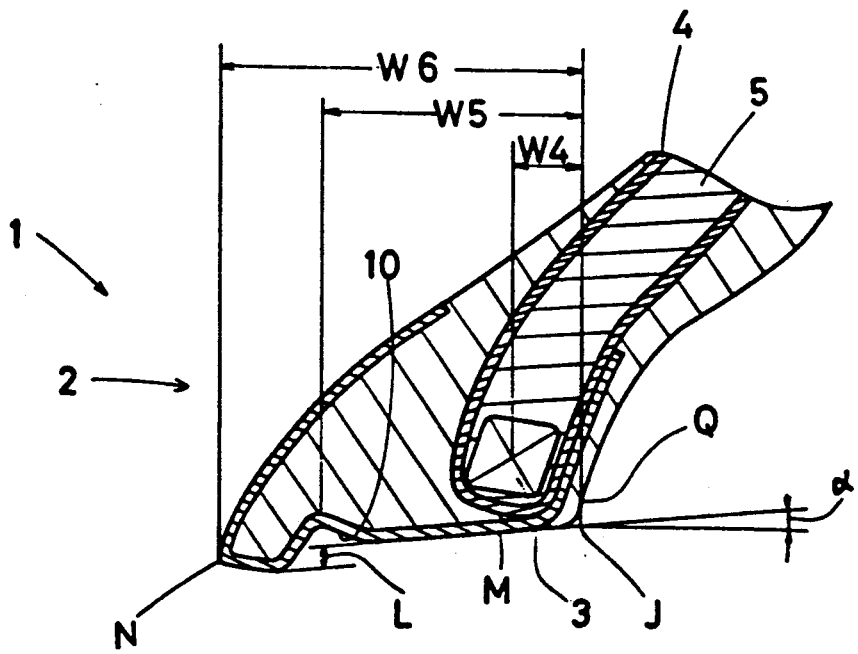
FIG. 4 is a fragmentary sectional view of the radial tire-rim assembly.
Figure 4:
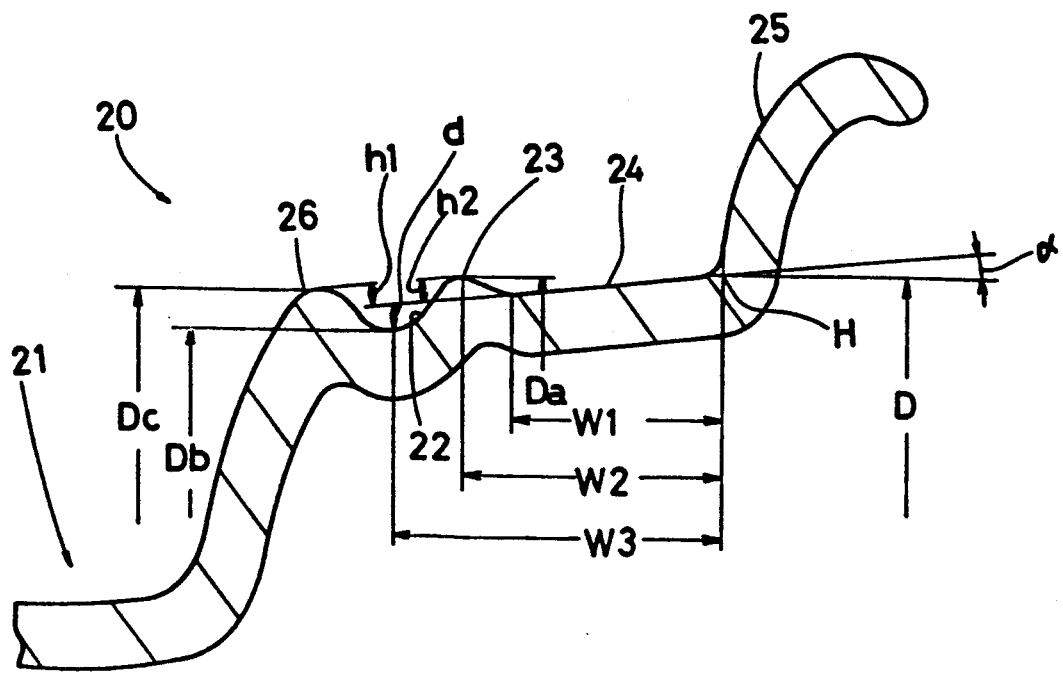

The bead seat 24 is slightly tapered inward (in the axial direction of the tire) at a certain angle ($\alpha$) as shown in FIG. 4. The bead seat may also be inversely tapered, if necessary.

The width W1 of the bead seat 24 conforms to the existing standards, so that the rim 20 fits into the radial tire of the invention as well as the radial tire of conventional structure.

The toe 9 and hump groove 10 of the radial tire 1 and the annular groove 22 and hump 23 of the rim 20 should have proper shapes and dimensions so that they snugly fit into each other. In addition, the diameter of the rim at different parts should be determined so that the following relationships are established.

$$-3.0 \text{ mm} \leq D-Da \leq +5.0 \text{ mm}$$

$$+2.0 \text{ mm} \leq D-Db \leq +20 \text{ mm}$$

$$0.0 \text{ mm} \leq D-Dc \leq +5.0 \text{ mm}$$

$$Da > Dc > Db$$

wherein D is the diameter at the end H of the bead seat, Da is the diameter at the hump 23, Db is the diameter at the bottom of the annular groove 22, and Dc is the diameter at the protuberence 26, as shown in FIG. 4.

The diameter Da at the hump is made greater than the diameter Dc at the protuberence so as to facilitate the fitting of the tire bead.

As mentioned above, the radial tire of the present invention has a tread, with both edges extending to the tire sides. Therefore, the tread becomes flat and comes into contact with the ground as schematically shown in FIG. 2 when the tire pressure has decreased due to puncture, thereby preventing the side from coming into contact with the ground and protecting it from damage by the contacting with the ground. In addition, the side having increased rigidity supports the weight of the vehicle. Therefore, the radial tire of the invention permits safe driving even with the tire pressure decreased.

The radial tire-rim assembly of the invention, which is characterized by that the radial tire has the toe extending inward (in the radial direction of the tire) and the rim has the annular groove to mate with the toe, keeps the tire in position when the tire pressure has decreased and the tire receives a lateral force, thereby ensuring continued safe driving.

According to this example, the bead core is close to the rim flange and the radial tire has the hump groove and the rim has the hump which fits into the hump groove. These arrangements enhance the power of the rim to hold the tire in place and hence ensure safer driving.

Incidentally, it is also possible to apply the above-mentioned bead structure only to either of the beads.

The present invention will be applied to various kinds of vehicles such as passenger cars, motorcycles, tricycles, all-terrain vehicles, trucks, and busses.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A radial tire having an aspect ratio of no more than 60% comprising
   a pair of bead cores disposed one in each bead of the tire,
   a carcass extending between the beads and turned up around said bead cores to be secured thereto,
   a bead apex disposed between each of the carcass turned up parts and the carcass main part and extending radially outward from the bead core,
   a tread with a curved surface disposed radially outside the carcass, and
   a belt having cords arranged between the carcass and the tread at a small angle to the circumferential direction of the tire,
   said tread extended axially of the tire so that the axial width thereof is wider than the maximum axial section width of the carcass, and so that the tread edges are positioned at a height in the range of 50 to 100% of the maximum cross-section height of the carcass,
   said tread having extended edge portions, each having a width of 5 to 20% of the tread width measured along the curved tread surface, and provided with sipings or fine grooves having a width of 0.1 to 5 mm arranged circumferentially of the tire at intervals of 5 to 20 mm.

2. The tire according to claim 1, wherein the thickness of the tread at the edges is in the range of 70 to 200% of the average of the thicknesses at the tread center and a position three quarters of the maximum width of the carcass measured from the tread center.

3. The tire according to claim 1, wherein the width of the belt is in the range of 70 to 100% of the tread width measured along the curved tread surface.

4. The tire according to claim 1, wherein the belt comprises at least one ply of organic cords having an elastic modulus of lower than 1000 kgf/sq.mm.

5. The tire according to claim 1, wherein the bead apexes are extended to a height of 40 to 110% of the height of the tread edge.

6. The tire according to claim 1, wherein the angles of the sipes are in the range of 45 to 90 degrees to the circumferential direction of the tire.

7. The tire according to claim 1, wherein the angles of the sipes are in the range of 0 to 45 degrees to the circumferential direction of the tire.

* * * * *